United States Patent [19]

Berrier

[11] 4,236,684
[45] Dec. 2, 1980

[54] THRUST AUGMENTED SPIN RECOVERY DEVICE

[75] Inventor: Bobby L. Berrier, Newport News, Va.

[73] Assignee: The United States of America as represented by the Administrator of the National Aeronautics and Space Administration, Washington, D.C.

[21] Appl. No.: 34,104

[22] Filed: Apr. 27, 1979

Related U.S. Application Data

[63] Continuation of Ser. No. 727,503, Sep. 28, 1976.

[51] Int. Cl.³ .............................................. B64C 15/02
[52] U.S. Cl. ........................................ 244/52; 244/87; 244/12.5
[58] Field of Search ................ 244/52, 216, 207, 12.5, 244/23 D, 87, 34 A, 51; 236/265.25

[56] References Cited

U.S. PATENT DOCUMENTS

| 3,515,361 | 6/1970 | Blackburn | 244/52 |
| 3,523,662 | 8/1970 | Rawcliffe | 244/52 |
| 3,669,386 | 6/1972 | Jacobs et al. | 244/52 |
| 3,756,542 | 9/1973 | Bertin et al. | 244/216 |
| 3,841,588 | 10/1974 | Arnold et al. | 244/207 |

Primary Examiner—Galen Barefoot
Attorney, Agent, or Firm—Wallace J. Nelson; John R. Manning; Howard J. Osborn

[57] ABSTRACT

Yaw control surfaces are provided for a jet propelled aircraft wherein a thrust augmented rudder is disposed above the jet exhaust stream and a thrust rudder tab extends downward therefrom into the jet exhaust stream with these components being cooperatively deflected to thereby generate yawing moments for directional control of the aircraft.

4 Claims, 4 Drawing Figures

THRUST AUGMENTED SPIN RECOVERY DEVICE

ORIGIN OF THE DISCLOSURE

The invention described herein was made by an employee of the National Aeronautics and Space Administration and may be manufactured and used by or for the Government of the United States of America for governmental purposes without the payment of any royalties thereon or therefor.

This is a continuation of application Ser. No. 727,503, filed Sept. 28, 1976.

BACKGROUND OF THE INVENTION

The invention relates generally to structure providing attitude control in an aircraft and more specifically to structure for providing yawing moments of sufficient magnitude to control the yaw in a jet-propelled aircraft flying at low speeds, at high angles of attack or in a spin.

The vertical and rudder assemblies of current aircraft generate the forces and moments necessary for directional control and stability in an aircraft by aerodynamic means wherein the deflection of the rudder imparts a sidewise acceleration to the airflow around the vertical tail to thereby create a sidewise reaction force upon the vertical tail and thus a yawing moment upon the aircraft. This side force is dependent upon the wing and fuselage flow field in which the vertical tail and rudder assembly is placed and is totally independent of thrust except for minor jet interference effects. Since conventional vertical tail and rudder assemblies are strictly aerodynamic devices, there are certain flight regimes and aircraft attitudes at which they lose their effectiveness. When an aircraft flies at low speeds or in other portions of its operating envelope of low dynamic pressure, the tail surfaces thereof may not have the capability to generate sufficient forces and moments for maintaining directional stability and control in the aircraft.

The prior art solutions used in minimizing this problem tend to degrade aircraft performance. One prior art solution to this problem is simply to increase vertical tail and rudder area to thereby increase the aerodynamic forces and moments at these flight conditions. Although this solution opens up the aircraft flight envelope, it requires that the aircraft carry the consequential increase in weight and drag throughout all other flight regimes for which the larger vertical tail is unnecessary. A second prior art solution is to limit an aircraft operating envelope such that a small vertical tail and rudder assembly is sufficiently large for effecting directional stability and control, but this solution limits aircraft maneuverability and thus runs contrary to the goal of producing highly maneuverable, high performance aircraft. Therefore, there is a definite need in the art to provide an aircraft yaw control system which retains its effectiveness at low speed flight regimes.

Another flight regime which can cause a substantial loss in directional control and stability is the operation of an aircraft at high angles of attack wherein the conventional vertical tail and rudder surfaces are washed by the fuselage and wing wake, a condition causing a loss of tail aerodynamic effectiveness, and in extreme instances, loss of aircraft control and subsequently aircraft spin. The problem is compounded by the fact that high angles of attack are required at low speeds wherein the vertical tail effectiveness has already been degraded. Prior art solutions to this problem of maintaining aircraft directional stability and control, at high angles of attack, include the attachment of ventral fins to the bottom surfaces of the aircraft, an increase in vertical tail and rudder height and mounting twin vertical tails to the sides of the aircraft at angles thereto which extend the tips of the vertical tails outwardly from the aircraft fuselage. Although these solutions improve the problem by providing tail and rudder surfaces which have some portions thereof situated outside of the fuselage and wing wake, they nonetheless degrade aircraft performance by increasing drag and weight. Furthermore, these solutions may increase tail flutter and create problems of integrating the tail surfaces into aft fuselage design. Therefore, there is a definite need in the art for an aircraft yaw control system which can retain its effectiveness at high angles of attack.

Serious problems can arise if the pilot exceeds the operational limits of an aircraft whose yaw control system relies solely upon the aerodynamic effectiveness of a conventional vertical tail and rudder assembly. Once the vertical tail and rudder surfaces lose their aerodynamic effectiveness, it is possible for the aircraft to enter a spin during which the same vertical tail and rudder must be used in the recovery of the aircraft therefrom. Even if the aerodynamic effectiveness of these surfaces could be regained during spin, a conventional vertical tail and rudder often imparts an undesirable coupling of yawing and rolling moments to the aircraft due to the rudder center of pressure being above the aircraft center of pressure. Under some conditions, this coupling may cause the spin to become more severe and preclude recovery. Because of this possibility, many aircraft carry an auxiliary spin recovery device which normally consists of a parachute attached to a long tether line. This device adds unwanted weight to the aircraft and increases drag because the parachute housing must be faired into the clean aircraft lines. Therefore, there is a definite need in the art to provide an aircraft yaw control system which retains its effectiveness throughout spin recovery.

Accordingly, it is an object of the present invention to provide a relatively lightweight and drag-free yaw control system in a jet propelled aircraft which retains its effectiveness at low flight speeds, at high angles of attack and throughout a spin.

Another object of the present invention is to provide a yaw control system which produces minimal adverse coupling of yawing and rolling moments when used for spin recovery.

Another object of the present invention is to provide an aircraft yaw control system which is conductive to aft, fuselage-empennage integration.

SUMMARY OF THE INVENTION

The foregoing and other objects are attainable in the present invention by providing a yaw control system, for an aircraft that has an aft-mounted jet propulsion system, that is responsive to both aerodynamic and propulsion forces. This control system includes a vertical tail for the aircraft with a thrust augmented rudder hingedly connected to the tail and a thrust rudder tab extending from the rudder into the path of the gaseous jet exhaust stream. The thrust vectoring rudder tab, when deflected cooperatively with the rudder, deflects the jet exhaust stream in a sideward direction to the aircraft whereas the deflected jet exhaust stream produces a thrust vectored yawing moment to the aircraft and also creates supercirculation about the vertical tail and thrust augmented rudder.

Supercirculation is a thrust-induced aerodynamic phenomenon wherein thrust vectoring near the trailing edge of a control surface affects the upstream airflows such that the local angle of attack of the control surface is effectively increased, thereby enabling the control surface to generate an additional amount of lift without increasing drag. The supercirculation about the vertical tail and thrust augmented rudder as created by the thrust rudder tab enables the rudder to generate an additional amount of yawing force beyond the amount it normally produces by purely aerodynamic means.

BRIEF DESCRIPTION OF THE DRAWINGS

A more complete appreciation of the present invention and many of the attendant advantages thereof will be readily apparent as the same becomes better understood by reference to the following description when considered in connection with the accompanying drawings wherein.

DETAILED DESCRIPTION

Figure 1:
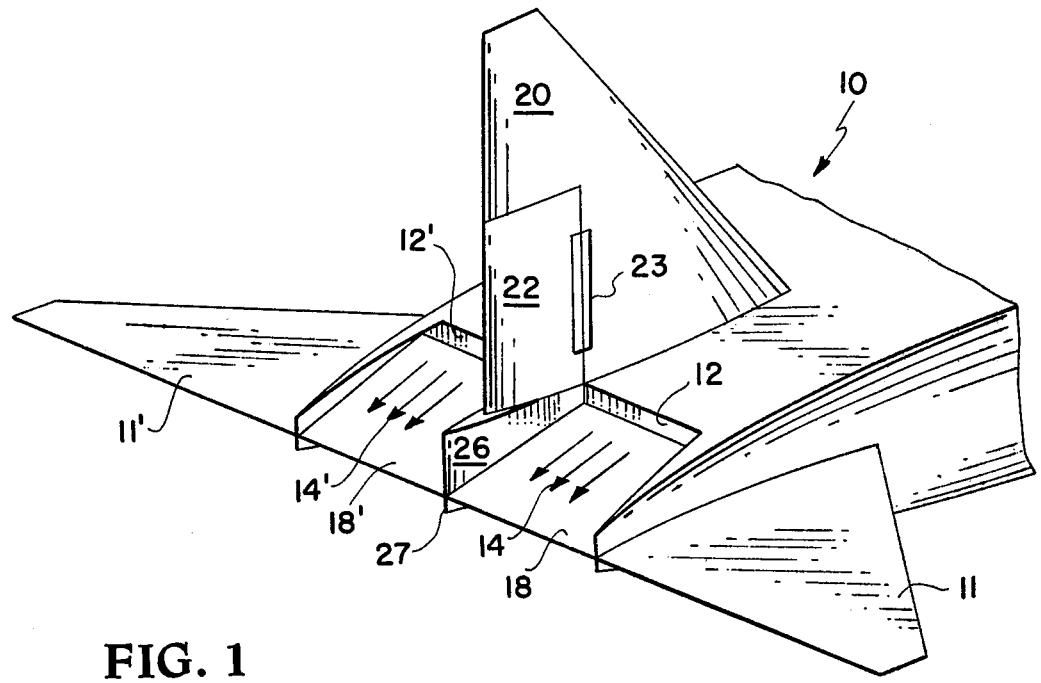
FIG. 1 is a partial view of an exemplary jet propelled aircraft incorporating the present invention.

Referring now to the drawings and more particularly to FIG. 1, a partial view of the aft fuselage of a jet propelled aircraft, generally designated by reference numeral 10, is shown. Aircraft 10 is provided with horizontal stabilizers 11 and 11' and a pair of jet nozzles 12 and 12' for exhausting the gaseous jet streams from the twin jet engines and as represented by arrow groups 14 and 14'. Exhaust streams 14 and 14' flow over the top of independent nozzle wedges 18 and 18' of nozzles 12 and 12'. A vertical tail 20 is rigidly attached to the fuselage of aircraft 10 and has a thrust augmented rudder 22 hinged thereto as designated by reference numeral 23. Rudder 22 extends rearwardly over exhaust streams 14 and 14' and is provided with a thrust rudder tab 26 attached to the lower edge thereof. Rudder tab 26 is positioned between exhaust streams 14 and 14' and extends downward from rudder 22 to a position just above nozzle wedges 18 and 18'. A bottom splitter plate 27 extends along the bottom nozzle area between wedges 18 and 18' and serves to maintain the exhaust stream from nozzles 12 and 12' separated.

Figure 2:
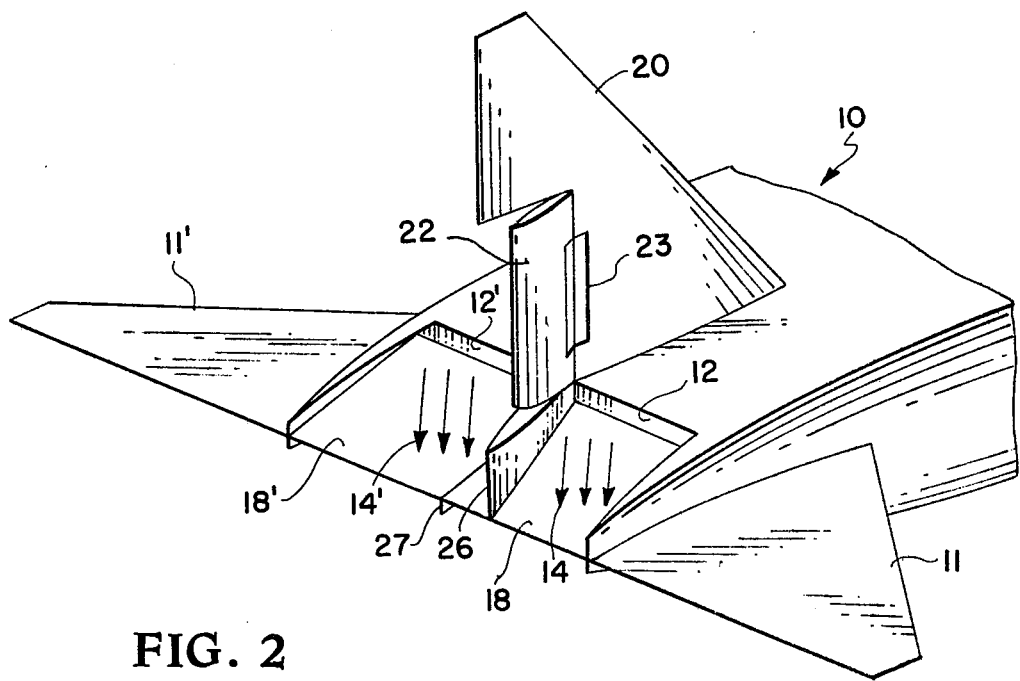
FIG. 2 is a view similar to FIG. 1 and showing the thrust augmented rudder and thrust rudder tab in a deflected position.
Figure 3:
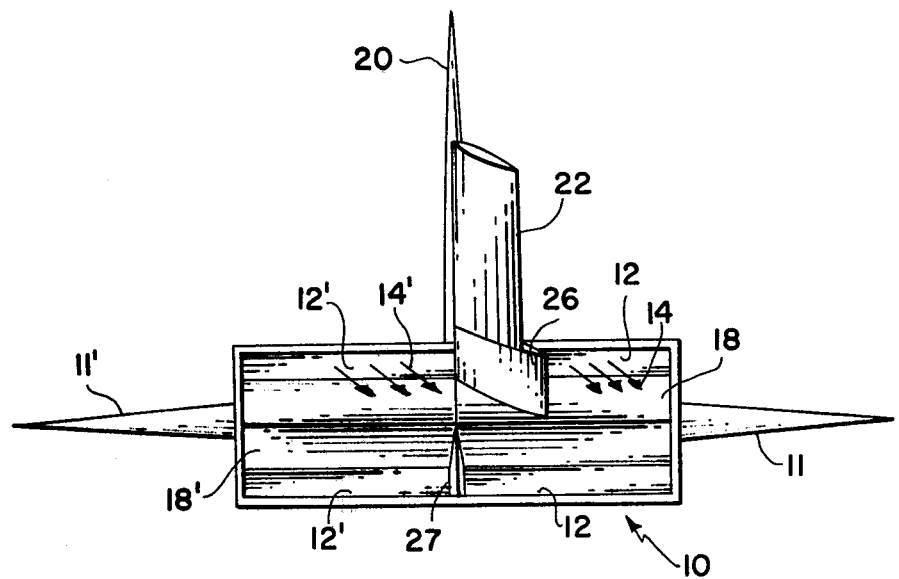
FIG. 3 is a rear planar view of the aft fuselage of the aircraft of FIG. 1 showing the thrust augmented rudder and thrust rudder tab of the present invention in a deflected position.

Referring now more particularly to FIGS. 2 and 3, thrust augmented rudder 22 and thrust rudder tab 26 are shown in a deflected position. The thrust augmented rudder 22 and thrust rudder tab 26 are also deflectable in the opposite angular direction from that shown in the drawings.

Figure 4:
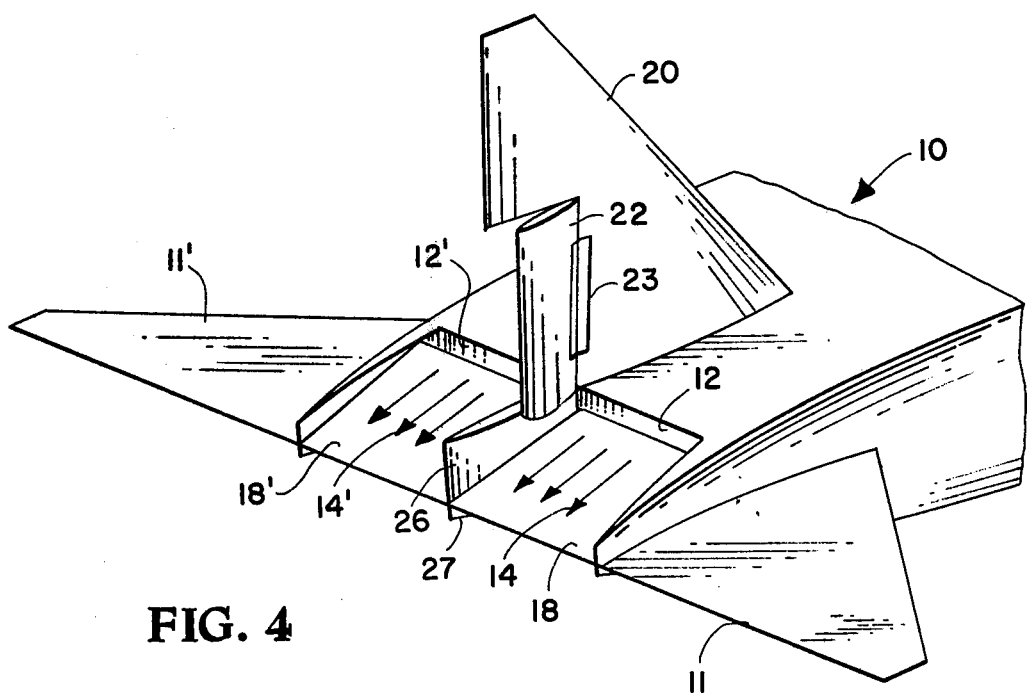
FIG. 4 is a partial view of a jet propelled aircraft showing an alternate embodiment of the present invention.

In FIG. 4, an alternate operative embodiment of the invention is shown wherein thrust vector tab 26 and thrust augmented rudder 22 are selectively detachable for independent deflection. Also, bottom splitter plate 27 may be attached to thrust vector tab 26 for deflection therewith if it is desired to utilize the full effect of the jet gases for thrust augmented yaw forces. The embodiment shown in FIG. 4 permits thrust augmented rudder 22 and thrust rudder tab 26 to be coupled to act as one unit when additional yaw control is required, as at low flight speeds or in spin, and decoupled during normal operating conditions when the thrust augmented rudder 22 can alone generate sufficient yawing forces for aircraft yaw control.

OPERATION

The operation of the present invention is now believed apparent. Thus, the present invention performs during flight similar to that of a conventional vertical tail and rudder assembly in that when the pilot desires to alter the yaw of his airplane or recover from a spin, he applies the desired input into the appropriate flight control system which causes the thrust augmented rudder 22 and the thrust rudder tab 26 to be deflected as one unit to a desired position such as illustrated in FIGS. 2 and 3.

Upon such deflection, thrust augmented rudder 22 reacts with the airflow passing over vertical tail 20 to impart upon the airflow an acceleration in a sideward direction relative to the aft-fuselage of aircraft 10 to thereby create a reaction force upon the fuselage 10. This force is a result of the aerodynamically generated yawing force of thrust augmented rudder 22. At the same time, thrust augmented rudder tab 26 reacts with jet exhaust streams 14 and 14' to deflect them to a sidewise direction relative to aft fuselage 10 (FIG. 2) thereby creating thrust vectoring of jet exhaust streams 14 and 14', the vectored thrust having a sideward component being the thrust vector yawing force of thrust rudder tab 26. Thrust rudder tab 26, by thrust vectoring jet exhaust streams 14 and 14', creates supercirculation about vertical tail 20 and thrust augmented rudder 22. Supercirculation is an aerodynamic phenomenon, triggered by thrust vectoring, occurring at the trailing edge of a control surface. Specifically, the thrust vectoring of jet exhaust streams 14 and 14' by thrust rudder tab 26 alters the direction from which the airflow upstream of vertical tail 20 approaches thereto, and this change in direction effectively increases the local angle of attack of vertical tail 20. With an effective increase in angle of attack, vertical tail 20 and thrust augmented rudder 22 generate an additional yawing force without increasing aircraft drag. This yawing force is additional to the yawing force generated by the vertical tail 20 and thrust augmented rudder 22 by the purely aerodynamic means described hereinabove.

It is thus seen that the present invention, by incorporating thrust vectoring and supercirculation, provides a yaw control system having many advantages over conventional vertical tail and rudder assemblies. As discussed hereinbefore, the effectiveness of conventional vertical tail and rudder assemblies depends solely upon their ability to generate aerodynamic forces upon exposure to the local airflows and this ability can degenerate at low flight speeds and high angles of attack. In contrast, the effectiveness of the present invention is not solely dependent upon the ability of a rudder retaining its aerodynamic effectiveness at such flight regimes. In having this advantage the present invention thereby removes the need for utilizing twin tail surfaces, ventral fins or enlarged tail surfaces for maintaining aircraft directional control at high angles of attack or low flight speeds, and thus offers substantial savings in aircraft weight, and drag. Additionally, the present invention improves aircraft maneuverability while broadening the aircraft operation envelope.

In the event of spin, and as long as the aircraft jet engines are operating, the present invention provides yaw control for stall recovery when conventional vertical tail and rudder assemblies may have lost all effectiveness. In stall recovery, the present invention, with its thrust vectoring being close to the aircraft center line, significantly reduces the problem characteristic of conventional vertical tail and rudder assemblies wherein the deflection of a conventional rudder will produce an undesired rolling moment as well as the desired yawing moment because the rudder's center of pressure is above the aircraft center of gravity.

The illustrated embodiments of the present invention shown in FIGS. 1-4 are applied to an aft fuselage incorporating a two-dimentional wedge nozzle such as that disclosed in U.S. patent application, Ser. No. 672,221, filed Mar. 31, 1976 for "Two Dimensional Wedge/Translating Shroud Nozzle," now U.S. Pat. No. 4,088,270. This configuration was selected for illustration purposes since it is ideally suited for installation of the present invention; however, the present invention could obviously be used on other types of configurations such as convergent-divergent nozzles and conventional axisymmetric type nozzles.

The relative lengths and widths of thrust augmented rudder 22 and thrust rudder tab 26 may be varied to suit a particular airplane design. Although the illustrated embodiment shows the thrust rudder tab 26 extending an amount more rearwardly than the thrust augmented rudder 22, such an arrangement is not critical for purposes of the present invention.

Although the invention has been described relative to specific embodiments thereof, it is not so limited and the disclosed specific embodiments are for illustration of the principle only and not intended to serve as limitations thereof. For example, although the embodiments described and shown herein are directed toward twin engine, single vertical tail aircraft, the invention is equally applicable to single engine or twin tail aircraft, the primary requirement being that the thrust rudder tab 26 must extend into the jet exhaust stream. Thus, these and other modifications and variations in the specific embodiments described will be readily apparent to those skilled in the art in light of the above teachings. It is therefore to be understood that within the scope of the appended claims, the invention may be practiced otherwise than as specifically described herein.

What is claimed as new and desired to be secured by Letters Patent of the United States is:

1. The combination of a twin engine jet propelled aircraft having a vertical tail and rudder yaw control surfaces and wherein the jet thrust is discharged in the rear portion of the aircraft, the improvement therewith comprising:
   a pair of adjacent horizontally disposed rectangular nozzles for discharging the jet thrust from the aircraft;
   individual nozzle wedges disposed in each of said nozzles and serving to divide each nozzle exit area into a pair of separate rectangular exits disposed one above and one below each said wedge;
   a single vertical tail rigidly attached to the aircraft, a rudder hingedly attached to said vertical tail and extending rearward to orient the lower edge thereof directly over the path of the jet thrust stream;
   a rudder tab of substantially planar shape disposed at the lower edge of said rudder and disposed substantially within the same plane as said rudder and extending downward therefrom substantially intermediate the nozzle pair to a position adjacent the individual nozzle wedges;
   a bottom splitter plate vertically disposed beneath and intermediate the individual nozzle wedges serving to maintain the exhaust stream exiting beneath each said wedge of the individual nozzles separated;
   whereby, as said rudder tab is deflected cooperatively with said rudder, said rudder tab interacts with the jet exhaust stream exiting above the nozzle wedges to deflect it to a sideward direction relative to the aircraft and thereby impart a yawing force upon the aircraft and create supercirculation about said rudder, wherein said rudder interacts with the airflow passing thereover to create an additional yawing force upon the aircraft.

2. The combination of claim 1 wherein said rudder and said rudder tab are rigidly connected to move as a unit at all times.

3. The combination of claim 1 wherein said rudder tab is separable from said rudder thereby permitting independent deflection of said rudder and said rudder tab.

4. The combination of claim 2 or 3 wherein said bottom splitter plate is movable with said rudder tab to utilize the effect of the jet exhaust gases exiting beneath the nozzle wedges for imparting additional yawing force to the aircraft.

* * * * *